March 18, 1952  H. W. PHILLIPS  2,589,570
MECHANICAL AMUSEMENT OR EXERCISING HORSE
Filed March 28, 1950  2 SHEETS—SHEET 1
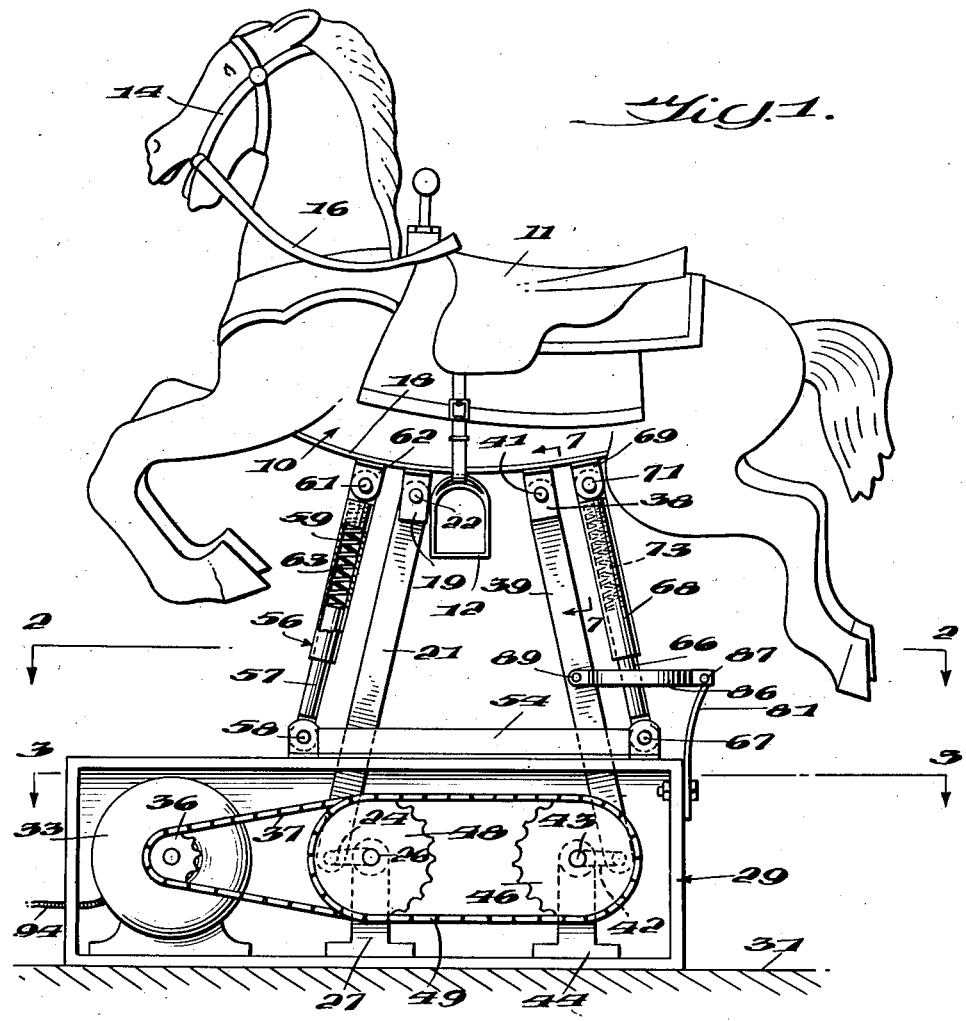
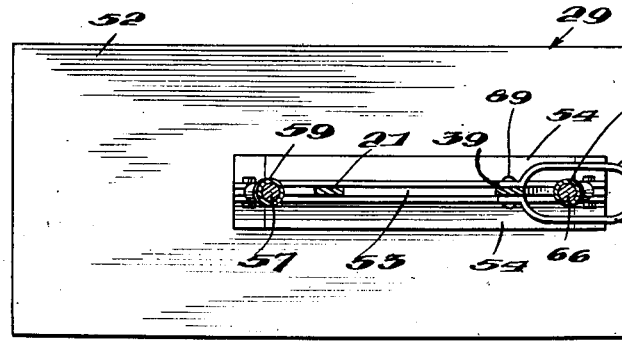
INVENTOR.
HERBERT W. PHILLIPS,
BY
ATTORNEY March 18, 1952     H. W. PHILLIPS     2,589,570
MECHANICAL AMUSEMENT OR EXERCISING HORSE
Filed March 28, 1950        2 SHEETS—SHEET 2
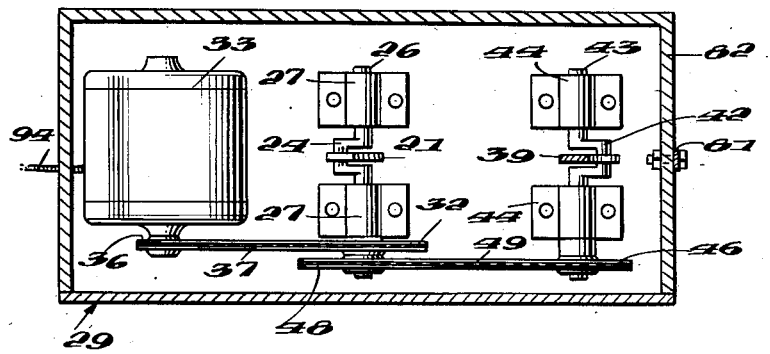
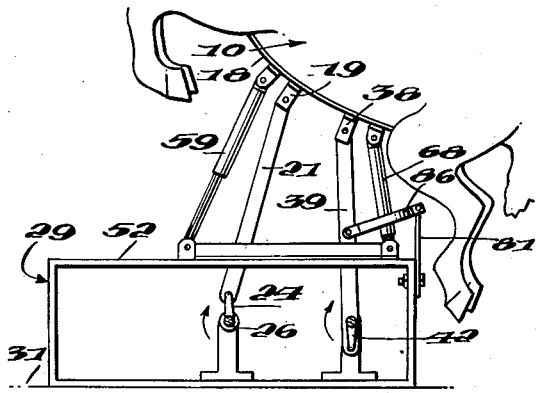
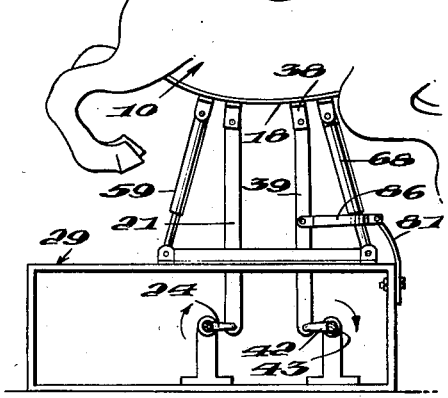
INVENTOR.
HERBERT W. PHILLIPS,
BY Lloyd P. Shank
ATTORNEY Patented Mar. 18, 1952

2,589,570

UNITED STATES PATENT OFFICE 2,589,570

MECHANICAL AMUSEMENT OR EXERCISING HORSE

Herbert W. Phillips, Washington, D. C., assignor of one-half to Robert L. Welch, Jr., Washington, D. C.

Application March 28, 1950, Serial No. 152,449

3 Claims. (Cl. 128—33)

The present invention relates to amusement devices and more particularly pertains to a power-driven apparatus wherein a physical element resembling an animal such as a horse is moved in such a manner that an individual seated on the horse will have the feeling of riding a galloping animal.

An object of the present invention is to provide a power transmitting mechanism for actuating an inanimate body element representing a horse so that an individual or a child seated in the saddle will obtain the sensation of a galloping or loping horse and thereby provide for entertainment and exercise for the rider.

A more specific object of the invention resides in providing crank arms and pitmans so designed and connected with the body of the animal that the horse moves in an orbital path to thereby facilitate the development of the sensation of riding a loping horse.

A more detailed object of the invention resides in providing pitmans connected to the intermediate under portion of the horse to provide for the support and tilting of the animal in combination with a plurality of resilient members to further promote a unique movement of the horse upon rotation of a pair of power-driven crank arms.

Other objects and features of the invention will be more apparent as the present disclosure proceeds and upon consideration of the accompanying drawings and the following detailed description wherein an exemplary embodiment of the invention is disclosed.

In the drawings:

Fig. 1 is a side elevational view partly in section of apparatus exhibiting the invention.

Fig. 2 is a sectional plan view taken on the line 2—2 of Fig. 1.

Fig. 3 is a sectional view of the driving mechanism taken on the line 3—3 of Fig. 1.

Fig. 4 is a diagrammatic fragmentary side elevational view illustrating one position of the crank arms and showing the resulting position of the animal.

Fig. 5 is a similar diagrammatic view showing another position of the horse.

Fig. 6 is a similar view showing still another position of the horse.

Fig. 7 is a fragmentary sectional view taken on the line 7—7 of Fig. 1.

The present invention is directed to a linkage and crank arm assembly in association with resilient means to provide a power-operating mechanism for moving a body member resembling a horse or the like through an orbital path so that the horse in its movements corresponds to that of a running horse. The mechanism including the animal has particular utility in connection with amusement devices for children but may also be employed as exercising apparatus.

Referring to the drawings there is shown at 10 a horse which may be formed of any suitable material such as wood or of cast metal. The horse may be suitably embellished by painting or the like to represent a spirited animal. In addition the horse may be provided with a saddle 11 or a representation thereof and stirrups 12 so that a child or an adult may be seated comfortably on the animal. A bridle 14 may be provided on the horse including reins 16.

An arcuate plate 18 is secured to the belly portion of the animal in any suitable manner and this plate serves the purpose of reinforcing this area of the horse and provides means for attaching the supporting and actuating links as hereinafter described. A pair of ears 19 are secured to the plate member 18 and depend therefrom in spaced relationship. A pitman arm or connecting bar 21 extends between the ears 19 and is connected thereto by means of a pivot pin 22. The lower end of the bar 21 is journaled on a crank arm 24. This crank arm 24 is carried by a crank shaft 26 which is mounted for rotation on the pedestal bearings 27. These pedestals may be secured to the bottom wall of a suitable casing 29 for enclosing the power driving mechanism and which is adapted to rest on a supporting surface 31. The casing 29 may be securely anchored to the surface 31.

A sprocket wheel 32 is secured to the crank shaft 26. A source of power such as an electric motor 33 is mounted within the casing 29 and provides means for driving the sprocket wheel 32. A smaller sprocket wheel 36 is carried by the motor shaft and a chain 37 is trained around the sprockets 36 and 32 to provide means for driving the crank shaft 26.

A pair of ears 38 are secured to the plate member 18 rearwardly of the ears 19. These ears 38 are so spaced as to accommodate a bar 39 therebetween which is connected to the ears by means of a pivot pin 41. This bar is journaled at its lower end on a crank arm 42 mounted within the casing 29. The crank arm 42 is carried by a crank shaft 43 supported by means of pedestal bearings 44 and secured to the base member of the casing 29. A sprocket wheel 46 is secured to the crank shaft 43. A similar sprocket wheel 48 is rigidly attached to the end of the crank shaft 26. A sprocket chain 49 is trained about the sprocket wheels 46 and 48 to provide means for transmitting power from the motor 33 to the crank shaft 43. It will be observed that the chain and sprocket wheel drive maintains the rotation of the crankshafts 26 and 43 in synchronism.

The top wall 52 of the casing is provided with a slot 53 through which the bars 21 and 39 extend. This area of the top wall 52 may be reinforced by angle members 54 which may be welded or otherwise secured to the top wall 52. It will be noted that the slot 53 and the space between the upstanding arms of the angle bars 54 is only slightly wider than the thickness of the bars 21 and 39. This arrangement provides lateral stability for the link members which in part support the horse and transmit movement from the crank arms to the horse. It will be further noted that the space between the ears 19 and 38 is only slightly greater than the transverse thickness of the bars 21 and 39 to further prevent lateral tilting of the horse.

A further feature of the apparatus includes resilient means for limiting forward and rear tilting of the horse. One of these resilient devices is shown generally at 56 and includes a rod or piston-shaped member 57 connected at its lower end to the angle bar 54 by means of a pin or rivet 58. This rod 57 extends into a cylinder 59. The cylindrical member 59 is connected at its upper end to the plate 18 by means of a bolt or rivet 61. The upper end of the cylindrical member 59 may be flattened and extends between ears 62 depending from the plate member 18. A helical spring 63 is arranged within the tubular member 59 and one end of the spring engages the upper end of the rod 57. The other end of the spring seats on the closed upper end of the cylinder 59. A similar arrangement is provided adjacent the rear connecting bar 39. A rod or piston member 66 is pivotally connected by means of a pin or bolt 67 to the angle bars 54. This rod 66 extends into a cylindrical member 68 which is attached at its upper end to the plate member 18 by means of depending ears 69 and a pivot pin 71. A helical spring 73 is arranged within the cylindrical member 68 and is seated at its upper end on a closed end of this cylindrical member. The lower end of the helical spring 73 is engaged by the upper end of the piston or rod member 66.

The mechanism further includes means for steadying the horse during the operation of the power driven crank assembly and this steadying and guiding means includes a relatively heavy leaf spring 81 bolted or otherwise secured to an end wall 82 of the casing. The upper end of the spring 81 is pivotally connected to rigid bracket members 84 and 86, by means of a rivet 87 or the like. These bracket members 84 and 86 span the rod 66 and the cylinder member 68 as will be apparent from a consideration of Fig. 2. The forward ends of the brackets 84 and 86 are pivotally attached by means of a rivet 89 or the like to opposite sides of the connecting bar 39. The spring 81 is flexible so that during operation this member may be deformed as will be apparent from a consideration of Figs. 4 to 6. The spring 81 at the same time limits the forward and rearward shifting of the upper end of the connecting bar 39 and accordingly the forward and rearward shifting of the horse 10. In addition the brackets 84 and 86 further tend to prevent lateral swinging of the connecting bar 39 and accordingly further stabilizes the tendency of the horse to shift laterally.

In operation electrical energy is supplied to the motor 33 through the wires or cables 94 and upon energization of the motor the sprocket wheels 32 and 46 are driven to rotate the crank shafts 26 and 43 in synchronism. It has been found that a desirable oscillatory movement of the horse is attained when the crank arms 24 and 42 are displaced from each other by approximately one hundred and eighty degrees. This angular disposition of the crank arms is maintained by the sprocket chain 49. When the crank arms 24 and 42 are in the positions shown in Fig. 1, the horse will assume a substantially neutral and horizontal position. The springs 63 and 73 are then partially compressed.

As the crank arm 24 moves in a clockwise direction in Fig. 1 it will eventually arrive in the position shown in Fig. 4. During this angular movement of the crank arm 24 a similar movement takes place in connection with the crank arm 42 which then arrives at about the six o'clock position as shown in Fig. 4. The crank arm 24 in moving from the position shown in Fig. 1 to the position shown in Fig. 4 shifts the pitman or connecting bar 21 upwardly and the forward portion of the horse is elevated. During this movement the spring 63 expands and assists in lifting the forward part of the horse. The pitman or connecting bar 39 is simultaneously moved downwardly and the spring 73 is then compressed. It will be observed that the horse is thereby tilted pronouncedly with its front feet in a raised position simulating the start of a galloping movement. It will further be observed that the horse in tilting to this position from that shown in Fig. 1, does not turn about a fixed axis. The crank 42 in moving to the six o'clock position moves the brackets 86 and 84 forwardly and this movement is permitted by the leaf spring 81. The spring 81 also tends to resist downward and rearward shifting of the horse and it is to be noted that this tendency is further resisted by the spring 73 within the tubular member 68.

The crank arms continue to rotate in the clockwise direction and arrive at another position as shown in Fig. 5, where the horse again assumes a substantially neutral position. It will be noted here that the spring 81 is bent forwardly to accommodate the new position of the crank arm 42. The pitman or connecting bar 39 is in this cycle of operation moving upwardly so that the spring 73 also tends to lift the rear portion of the horse. The spring 63 during this part of the operation is being compressed.

Another position of the animal is illustrated in Fig. 6 where the crank arm 24 is shown in the six o'clock position with the crank arm 42 in the twelve o'clock position. This position of the parts tilts the animal pronouncedly forward and the pitman 39 is then in its uppermost position. Further forward tilting of the animal is opposed by the spring 63 and by means of the leaf spring 81. The horse during further clockwise rotation of the crank shafts 26 and 43 returns to the position shown in Fig. 1.

While the invention has been illustrated and described with reference to a particular structural arrangement and with regard to a particularly shaped inanimate animal, it will be appreciated that changes may be made in the details as well as the general organization and other horses or animals may be used. Such modifications and others may be made without departing from the spirit and scope of the invention as set forth in the appended claims.

What I claim and desire to secure by Letters Patent is:

1. In an amusement device, an animal element having a belly portion, an arcuate plate lying along and secured to said belly portion, two rotatable crank shafts, a crank arm on each crank shaft, means for driving said crank shafts and maintaining the crank arms thereof in a one hundred and eighty degree displaced relationship, a casing enclosing the crank shafts having an elongated slot in an upper portion thereof, a bar connected to one crank arm extending upwardly through said slot and pivotally connected to a front portion of said plate, a second bar connected to the other crank arm extending upwardly through said slot and pivotally connected to said plate at a point spaced rearwardly from the upper end of the first bar, a piston rod connected to the upper portion of the casing at a front end of said slot, a cylinder member receiving said rod and pivotally connected to the plate forwardly of the upper end of the first bar, a spring within said cylinder member compressed between an end of the rod and an upper end of the cylinder member, a second rod pivotally connected to the upper portion of the casing adjacent a rear end of said slot, a second cylinder member pivotally connected to the plate rearwardly of the upper end of the second bar and receiving the second rod, a spring within the second cylinder member compressed between the upper end of the second rod and an upper end of the second cylinder member, a leaf spring secured to the casing and extending upwardly therefrom, and link means connecting an upper end of the leaf spring to one of said bars to prevent unlimited swinging movement of the upper end thereof.

2. In an exercising device, an animal element having a belly portion, an arcuate plate lying along and secured to said belly portion, two rotatable crank shafts, a crank arm on each crank shaft, means for driving said crank shafts and maintaining the crank arms in a given angularly displaced relationship, a casing enclosing the crank shafts having an elongated slot in an upper portion thereof, a bar connected to one crank arm extending upwardly through said slot and pivotally connected at its upper end to said plate, a second bar connected to the other crank arm extending upwardly through said slot and pivotally connected to said plate member at a point spaced rearwardly from the upper end of the first bar, said bars each having a width substantially equal to the width of said slot, a member pivotally connected to the upper portion of the casing at a front end of said slot, a second member pivotally connected to the plate forwardly of the upper end of the first bar, resilient means compressed between said members, a third member pivotally connected to the upper portion of the casing adjacent a rear end of said slot, a fourth member pivotally connected to the plate member rearwardly of the upper end of the second bar, resilient means compressed between the third and fourth members, a leaf spring secured to the casing and extending upward therefrom, and means connecting an upper end of the leaf spring to one of said bars to prevent unlimited swinging movement of the upper end thereof.

3. In an amusement device, an animal element having a belly portion, an arcuate plate lying along and secured to said belly portion, two rotatable crank shafts, a crank arm on each crank shaft, means for driving said crank shafts and maintaining the crank arms in an angularly displaced relationship, a casing enclosing the crank shafts having an elongated slot in an upper portion thereof, a pitman arm connected to one crank arm extending upwardly through said slot and pivotally connected at its upper end to said plate, a second pitman arm connected to the other crank arm extending upwardly through said slot and pivotally connected at its upper end to said plate at a point spaced rearwardly from the upper end of the first pitman arm, guide means along and above said slot preventing lateral movements of said pitman arms, resilient means interposed between said plate and said casing forwardly of the first pitman arm, resilient means interposed between the plate and said casing rearwardly of the second pitman arm, a leaf spring secured to the casing and extending upwardly therefrom, and links connecting an upper end of the leaf spring to the second bar to prevent unlimited swinging movement of the upper end thereof.

HERBERT W. PHILLIPS.

REFERENCES CITED

The following references are of record in the file of this patent:

UNITED STATES PATENTS

| Number | Name | Date |
|---|---|---|
| 1,671,162 | Peters | May 29, 1928 |
| 1,791,777 | Webb | Feb. 10, 1931 |
| 2,278,861 | Burke | Apr. 7, 1942 |